3,144,084
LAWN EDGE TRIMMER
Albert L. Smith, 5265 S. Menard Drive,
Hales Corners, Wis.
Filed May 24, 1963, Ser. No. 282,959
3 Claims. (Cl. 172—15)

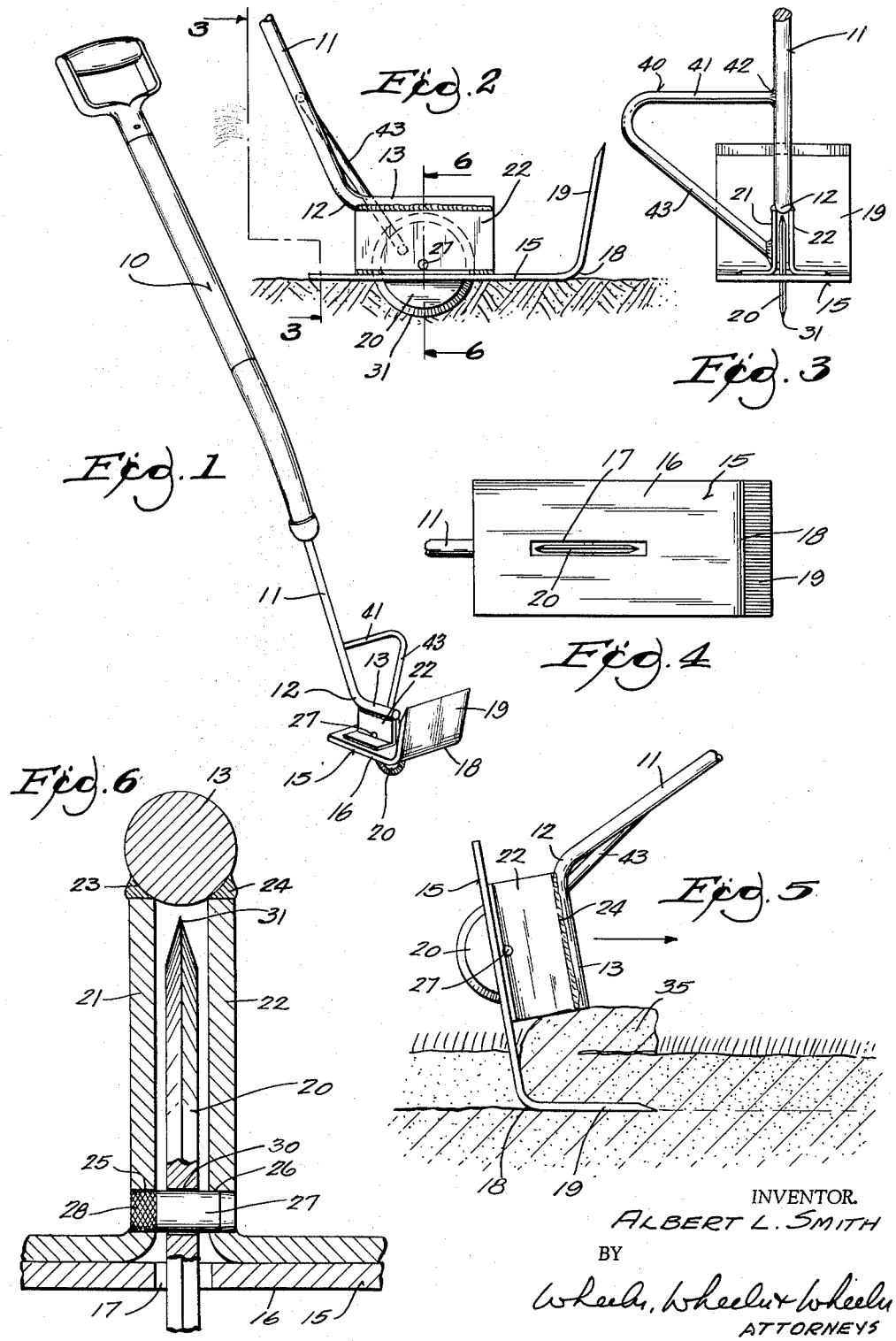

My invention relates to an improvement in a lawn edge trimmer.

The lawn edge trimmer of this invention is not only designed for sturdy construction and efficient operation in a lawn trimming operation, but is so arranged as to its functioning parts that the lines of trim and the removal of sod or other material to be trimmed away from the line of trim may be efficiently and easily carried out while the operator remains in a comfortable, almost erect working position. Furthermore, in accord with this invention, the cutter blade is a rotary wheel-like blade extending through a slot in a wide, flat shoe which determines the depth of cut by the wheel-like blade and which also is so up-turned at the forward end of the shoe as to provide a undercutting knife disposed at such an angle to the long operating handle of the complete tool that an efficient sod remover is provided.

In the drawings:

FIGURE 1 is a perspective view of the complete lawn trimmer of this invention.

FIGURE 2 is a side elevation of the lawn trimmer of FIGURE 1, most of the handle portion of the tool being deleted.

FIGURE 3 is a section on line 3—3 of FIGURE 2.

FIGURE 4 is a bottom view of the lawn trimmer shown in FIGURE 2.

FIGURE 5 is a side elevation of the portions of the lawn trimmer shown in FIGURE 2, but the view shows these portions in the position assumed when the trimmer is being used to remove sod.

FIGURE 6 is a section on line 6—6 of FIGURE 2 and showing the relationship of the cutter wheel mounting means and the main rod-like portion of the handle.

The principal structural members of this lawn trimmer include a somewhat elongated handle 10 which is developed in its downwardly and forwardly disposed portion 11 in the form of a rod curved at 12 to provide a horizontal tool structural member 13.

Secondly, among the principal structural members is a shoe 15 including a flat portion 16 centrally slotted at 17 and forwardly upwardly bent at 18 to provide a sod cutter 19.

Thirdly, among the principal structural portions of this lawn trimmer, there is a rotary trimmer disc 20 mounted in the slot 17 by means of two short, but heavy angle irons 21 and 22 so spaced at either side of the slot 17 and secured to shoe 15 as to provide mounting means for trimmer disc 20. In addition to the function of the angle irons 21 and 22 to provide mounting means for the trimmer disc 20, it will be noted that the angle irons 21 and 22 have horizontal upper margins spaced from each other in proper relation to house the trimmer disc and also to receive the portion 13 of handle 10–11 so that welds at 23 and 24 provide sturdy and permanent connection between the handle and the angle irons. Since the angle irons are secured as by spot welds to the shoe 15, it will be seen that these principal structural elements thus far described are very sturdily and readily assembled.

Special note is made of the fact that the angle irons 21 and 22 are bored at 25 and 26 with bores of identical diameter so that an axis pin 27 of the same external diameter as the bore at 25–26 is knurled at 28 to provide a drive fit for the pin 27 in the angle iron 21. Then to provide free rotation of the trimmer disc 20, the disc is bored at 30 to provide a free running rotating relationship of the disc 20 upon the pin 27. It should be noted that the trimmer disc 20 is sharpened at 31, and since the disc is case hardened, a very efficient cutting and trimming tool is arranged in a housing between angle irons 21 and 22 in protected relationship as provided by the portion 13 of the handle 10–11. Furthermore, since the angle irons are only slightly longer than the diameter of the trimmer disc 20 and the ends of the angle irons are not turned in to close the ends of the housing in which the disc is adapted to rotate, it is clear that earth or other material tends to free itself from a position within the housing provided by angle irons and the handle portion 13.

Reference has been made to the fact that the shoe 15 is bent at its forward end at 18 to provide a sod cutting blade 19 shown most clearly in FIGURES 1 and 5. For use as a sod cutter, the trimming tool of the instant invention is turned to the position shown in FIGURE 5 so that the sod cutter portion 19 of the shoe 15 is in approximately horizontal relation to the sod 35 to be cut. The resulting operation is clearly disclosed in FIGURE 5, it being understood, of course, that relatively narrow bands of sod are to be handled by a tool of this type.

Under some circumstances, the operation of the cutter disc 20 may involve the cutting of soil or other material which is quite firm. I therefore have provided a foot rest 40 including a horizontal rod-like element 41 welded to the portion 11 of the handle at 42. The same rod-like configuration of the foot rest 40 is then developed into an angularly disposed portion 43 extending to one of the angle irons 21 or 22. As shown, the welded connection of the portion 43 is connected to the angle iron 22 on what might be termed the left side of the tool.

It will now be clear that the freely revoluble disc 20 may be rolled along in a trimming operation to determine the line of sod trimming or other trimming to be accomplished. The handle 10–11 of the tool will be disposed approximately as shown in FIGURE 1 in the hands of an operator who may stand virtually erect while he operates the tool. If the disc 20 encounters material which is difficult to cut, the foot of the operator may be placed upon the foot rest 40 at 41 to assist in the rolling cut which is to be accomplished. If, when the line of trim has been accomplished by the cutting disc 20, some of the material as that shown at 35 in FIGURE 5 is to be removed from one side of the line of trim, the tool may be inverted as shown in FIGURE 5 and the sod or other material may be undercut and removed.

I claim:

1. A sod-edging and trimming tool comprising a shoe for sliding on the sod to be trimmed and having a slot longitudinally therein, angle irons mounted on the shoe and extending in spaced relation along the opposite longitudinal sides of the slot, an axis pin extending between the angle irons and across the slot, a sharp-edged cutter disc revoluble on the pin and extending through the slot and into the space between the angle irons, and a rod-like handle secured to the top edges of the angle irons for co-action therewith in forming a partial housing for the cutter disc.

2. The tool of claim 1 in which the slot extends for approximately the center one-half of the shoe length, and the angle irons extend from end to end of the slot and have adjacent faces at substantially right-angles to the shoe and in spaced relation for rotation of the cutter disc in relatively close proximity to the adjacent angle iron faces, the angle irons extending longitudinally of the shoe for substantial distances beyond the cutter disc periphery for eliminating danger of contact of the operator with the disc edge while the tool is in use.

3. The tool of claim 1 in which axis pin extends between the angle irons adjacent the shoe and approximately midway of the slot length and is held by the angle irons for removal endwise, and the cutter disc rotates on the pin as an axle for removal of the pin and cutter at any time.

References Cited in the file of this patent

UNITED STATES PATENTS

| | | |
|---|---|---|
| 930,846 | Dean | Aug. 10, 1909 |
| 1,139,978 | Imhof et al. | May 18, 1915 |
| 1,753,132 | Ruebel | Apr. 1, 1930 |
| 2,476,461 | Smith | July 19, 1949 |
| 2,506,366 | Korn | May 2, 1950 |
| 2,690,636 | Besse et al. | Oct. 5, 1954 |
| 2,928,479 | Petersen | Mar. 15, 1960 |

FOREIGN PATENTS

| | | |
|---|---|---|
| 576,333 | Great Britain | Mar. 29, 1946 |